(12) United States Patent
Tong et al.

(10) Patent No.: US 11,789,313 B2
(45) Date of Patent: Oct. 17, 2023

(54) BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Guangyun Tong, Beijing (CN); Xu Chen, Beijing (CN); Yu Zhang, Beijing (CN); Bochang Wang, Beijing (CN); Xuefei Qin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/779,776

(22) PCT Filed: Jan. 11, 2021

(86) PCT No.: PCT/CN2021/071082
§ 371 (c)(1),
(2) Date: May 25, 2022

(87) PCT Pub. No.: WO2021/143645
PCT Pub. Date: Jul. 22, 2021

(65) Prior Publication Data
US 2023/0004045 A1    Jan. 5, 2023

(30) Foreign Application Priority Data
Jan. 13, 2020  (CN) .......................... 202020066691.6

(51) Int. Cl.
*G02F 1/13357*    (2006.01)
(52) U.S. Cl.
CPC .. *G02F 1/133608* (2013.01); *G02F 1/133605* (2013.01); *G02F 1/133606* (2013.01)

(58) Field of Classification Search
CPC ......... G02F 1/133608; G02F 1/133605; G02F 1/133606
See application file for complete search history.

(56) References Cited

U.S. PATENT DOCUMENTS

2005/0254236 A1*  11/2005  Fu ..................... G02F 1/133608
                                                          362/186
2017/0038633 A1    2/2017  Na
(Continued)

FOREIGN PATENT DOCUMENTS

CN           1584696 A     2/2005
CN         202371568 U     8/2012
(Continued)

OTHER PUBLICATIONS

PCT/CN2021/071082 international search report and written opinion.

*Primary Examiner* — Karabi Guharay
(74) *Attorney, Agent, or Firm* — IPRO, PLLC (57) ABSTRACT

A backlight module and a display device, including a back panel, a first middle frame, and a film layer. The film layer includes a first side, a second side, a third side, a fourth side. Hanging holes are at edges of the film layer. Hanging elements corresponding to hanging holes are on the back panel. The hanging element is connected to the film layer via hanging hole. Among hanging holes and hanging elements on the first side, from the third side to the fourth side, first gaps between sidewalls of hanging elements away from the fourth side and sidewalls of hanging holes away from the fourth side increase; among hanging hole and hanging element on the third side, from the first side to the second side, a first gap between sidewall of hanging element away from the second side and sidewall of hanging hole away from the second side increases.

20 Claims, 5 Drawing Sheets

(56) References Cited

U.S. PATENT DOCUMENTS

| | | |
|---|---|---|
| 2018/0299722 A1 | 10/2018 | Ohtsubo |
| 2019/0204678 A1 | 7/2019 | Hosoki |
| 2021/0325733 A1 | 10/2021 | Ma |

FOREIGN PATENT DOCUMENTS

| | | | | |
|---|---|---|---|---|
| CN | 203147502 U | | 8/2013 | |
| CN | 103759227 A | * | 4/2014 | ............ F21V 17/002 |
| CN | 207181904 U | | 4/2018 | |
| CN | 108351545 A | | 7/2018 | |
| CN | 109661609 A | | 4/2019 | |
| CN | 211014952 U | | 7/2020 | |

* cited by examiner

BACKLIGHT MODULE AND DISPLAY DEVICE

CROSS REFERENCE TO RELATED APPLICATIONS

The present application is a National Stage of International Application No. PCT/CN2021/071082, filed on Jan. 11, 2021, which claims the priority of Chinese Patent Application No. 202020066691.6, filed to the Chinese Patent Office on Jan. 13, 2020 and entitled "BACKLIGHT MODULE AND DISPLAY DEVICE", both of which are incorporated in their entireties herein by reference.

FIELD

The present disclosure relates to the technical field of display, and in particular to a backlight module and a display apparatus.

BACKGROUND

The display technology is undergoing great changes while the Internet of Things, the 5th generation mobile communication technology (5G) and other technologies are developing rapidly. As the mainstream display technology at present, a liquid crystal module is developing towards high brightness, high color gamut, high resolution, large size and thinness.

Ultra-large display modules (of 98 inches and 110 inches) are rather rare and less competitive in the market currently because their backlight modules cannot be adapted to expansion of a film layer.

SUMMARY

The present disclosure provides the backlight module, which includes:

a back panel, wherein the back panel comprises a bottom plate and a side plate formed at a periphery of the bottom plate, and the back panel is provided with hanging elements;

a first middle frame, wherein the first middle frame is located at one side of the back panel, and a surface away from the bottom plate, of the first middle frame is provided with a bearing surface for supporting a film layer; and the film layer, wherein the film layer is at a side away from the back panel, of the first middle frame, the film layer is provided with a first side, a second side, a third side, and a fourth side, the first side is opposite the second side, the third side is opposite the fourth side, the third side and the fourth side are between the first side and the second side and are connected to the first side and the second side, a plurality of hanging holes are provided at edges of the film layer corresponding to the first side and to the third side, the hanging holes correspond one-to-one to hanging elements, in each set of hanging hole and hanging element corresponding to each other, the film layer is connected to the back panel via the hanging hole for the hanging element to pass therethrough, in each set of the hanging hole and the hanging element corresponding to each other on the first side, a first gap is provided between a sidewall away from the fourth side, of the hanging element and a sidewall away from the fourth side, of the hanging hole, and in a direction from the third side to the fourth side, the first gaps between the hanging holes and hanging elements corresponding to each other gradually increase in size; and in each set of the hanging hole and the hanging element corresponding to each other on the third side, a first gap is provided between a sidewall away from the second side, of the hanging element and a sidewall away from the second side, of the hanging hole, and in a direction from the first side to the second side, the first gaps between the hanging holes and hanging elements corresponding to each other gradually increase in size.

Optionally, in each set of the hanging hole and the hanging element corresponding to each other on the first side, a second gap is provided between a sidewall away from the first side, of the hanging element and a sidewall away from the first side, of the hanging hole, a third gap is provided between a sidewall away from the third side, of the hanging element and a sidewall of the hanging hole away from the third side, of the hanging hole, and a fourth gap is provided between a sidewall away from the second side, of the hanging element and a sidewall away from the second side, of the hanging hole, wherein the second gaps are equal to each other in size, the third gaps are equal to each other in size, and the fourth gaps are equal to each other in size.

Optionally, in each set of the hanging hole and the hanging element corresponding to each other on the third side, a second gap is provided between a sidewall away from the third side, of the hanging element and a sidewall away from the third side, of the hanging hole, a third gap is provided between a sidewall away from the first side, of the hanging element and a sidewall away from the first side, of the hanging hole, and a fourth gap is provided between a sidewall away from the fourth side, of the hanging element and a sidewall away from the fourth side, of the hanging hole, wherein the second gaps are equal to each other in size, the third gaps are equal to each other in size, and the fourth gaps are equal to each other in size.

Optionally, in each set of the hanging hole and the hanging element corresponding to each other on the first side, a second gap is provided between a sidewall away from the first side, of the hanging element and a sidewall away from the first side, of the hanging hole, a third gap is provided between a sidewall away from the third side, of the hanging element and a sidewall away from the third side, of the hanging hole, and a fourth gap is provided between a sidewall away from the second side, of the hanging element and a sidewall away from the second side, of the hanging hole, wherein the second gaps between the hanging holes and hanging elements corresponding to each other on the first side are equal to each other in size, the third gaps between the hanging holes and hanging elements corresponding to each other on the first side are equal to each other in size, and the fourth gaps between the hanging holes and hanging elements corresponding to each other on the first side are equal to each other in size; and in each set of the hanging hole and the hanging element corresponding to each other on the third side, a second gap is provided between a sidewall away from the third side, of the hanging element and a sidewall away from the third side, of the hanging hole, a third gap is provided between a sidewall away from the first side, of the hanging element and a sidewall away from the first side, of the hanging hole, and a fourth gap is provided between a sidewall away from the fourth side, of the hanging element and a sidewall away from the fourth side, of the hanging hole, wherein the second gaps between the hanging holes and hanging elements corresponding to each other on the third side are equal to each other in size, the third gaps between the hanging holes and hanging elements corresponding to each other on the third side are equal to each other in size, and the fourth gaps between the hanging holes and hanging elements corresponding to each other on the third side are equal to each other in size.

Optionally, in each set of the hanging hole and the hanging element corresponding to each other on the first side, in a direction from the third side to the fourth side, the first gaps between the hanging holes and hanging elements corresponding to each other linearly and gradually increase in size.

Optionally, in each set of the hanging hole and the hanging element corresponding to each other on the third side, in a direction from the first side to the second side, the first gaps between the hanging holes and hanging elements corresponding to each other linearly and gradually increase in size.

Optionally, in each set of the hanging hole and the hanging element corresponding to each other on the first side, in a direction from the third side to the fourth side, the first gaps between the hanging holes and hanging elements corresponding to each other linearly and gradually increase; and in each set of the hanging hole and the hanging element corresponding to each other on the third side, in a direction from the first side to the second side, the first gaps between the hanging holes and hanging elements corresponding to each other linearly and gradually increase in size.

Optionally, in each set of the hanging hole and the hanging element corresponding to each other on the first side:

the second gap between the hanging hole and the hanging element corresponding to each other is 0.4 mm-0.6 mm;

the third gap between the hanging hole and the hanging element corresponding to each other is 0.45 mm-0.55 mm; and the fourth gap between the hanging hole and the hanging element corresponding to each other is 0 mm.

Optionally, in each set of the hanging hole and the hanging element corresponding to each other on the third side:

the second gap between the hanging hole and the hanging element corresponding to each other is 0.4 mm-0.6 mm;

the third gap between the hanging hole and the hanging element corresponding to each other is 0.45 mm-0.55 mm; and the fourth gap between the hanging hole and the hanging element corresponding to each other is 0 mm.

Optionally, in each set of the hanging hole and the hanging element corresponding to each other on the first side:

the second gap between the hanging hole and the hanging element corresponding to each other is 0.4 mm-0.6 mm, the third gap between the hanging hole and the hanging element corresponding to each other is 0.45 mm-0.55 mm, and the fourth gap between the hanging hole and the hanging element corresponding to each other is 0 mm; and in each set of the hanging hole and the hanging element corresponding to each other on the third side:

the second gap between the hanging hole and the hanging element corresponding to each other is 0.4 mm-0.6 mm, the third gap between the hanging hole and the hanging element corresponding to each other is 0.45 mm-0.55 mm, and the fourth gap between the hanging hole and the hanging element corresponding to each other is 0 mm.

Optionally, a plurality of hanging holes are provided at an edge of the film layer corresponding to the second side, hanging elements corresponding one-to-one to the hanging holes are provided on the back panel, and in each set of the hanging hole and the hanging element corresponding to each other, the hanging element is connected to the film layer via the hanging hole; and in each set of the hanging hole and the hanging element corresponding to each other on the second side, the first gap is provided between the sidewall away from the second side, of the hanging element and the sidewall away from the second side of the hanging hole, a second gap is provided between a sidewall away from the first side, of the hanging element and a sidewall away from the first side, of the hanging hole, a third gap is provided between a sidewall away from the fourth side, of the hanging element and a sidewall away from the fourth side, of the hanging hole, and a fourth gap is provided between a sidewall away from the third side, of the hanging element and a sidewall away from the third side, of the hanging hole.

Optionally, in each set of the hanging hole and the hanging element corresponding to each other on the second side:

the first gaps are equal to each in size;

the second gaps are equal to each in size;

in a direction of from the third side to the fourth side, the third gaps gradually increase in size; and the fourth gaps are equal to each in size.

Optionally, in each set of the hanging hole and the hanging element corresponding to each other on the second side:

the first gap is 1 mm-1.5 mm;

the second gap other is 0.4 mm-0.6 mm;

in a direction from the third side to the fourth side, the third gaps between the hanging holes and hanging elements corresponding to each other linearly and gradually increase in size; and the fourth gap is 0.45 mm-0.55 mm.

Optionally, the backlight module further includes a reflective plate and a diffusion plate;

the reflective plate is between the back panel and the film layer;

the diffusion plate is between the reflective plate and the film layer, and a side away from the film layer, of the diffusion plate makes contact with the bearing surface; the diffusion plate is provided with a first side, a second side, a third side, and a fourth side, in the diffusion plate, the first side is opposite the second side, the third side is opposite the fourth side, the third side and the fourth side are between the first side and the second side and are connected to the first side and the second side; edges corresponding to the first side and the third side of the diffusion plate are both provided with a plurality of positioning recesses; and the back panel is provided with positioning inserts corresponding one-to-one to the positioning recesses, and in each set of positioning recess and positioning insert corresponding to each other, the positioning inserts are clamped into the positioning recesses so as to be positioned in the diffusion plate in an inserted manner.

Optionally, an edge corresponding to the second side of the diffusion plate is provided with a plurality of positioning recesses, and the plurality of positioning recesses on the second side of the diffusion plate and the plurality of positioning recesses on the first side of the diffusion plate are arranged symmetrically with respect to a centerline of the diffusion plate parallel to the first side.

Optionally, an edge corresponding to the fourth side of the diffusion plate is provided with a plurality of positioning recesses, and the plurality of positioning recesses on the fourth side of the diffusion plate and the plurality of positioning recesses on the third side of the diffusion plate are arranged symmetrically with respect to a centerline of the diffusion plate parallel to the third side.

Optionally, an edge corresponding to the second side of the diffusion plate is provided with a plurality of positioning recesses, and the plurality of positioning recesses on the second side of the diffusion plate and the plurality of positioning recesses on the first side of the diffusion plate are arranged symmetrically with respect to a centerline of the diffusion plate parallel to the first side; and an edge corresponding to the fourth side of the diffusion plate is provided with a plurality of positioning recesses, and the plurality of positioning recesses on the fourth side of the diffusion plate and the plurality of positioning recesses on the third side of the diffusion plate are arranged symmetrically with respect to a centerline of the diffusion plate parallel to the third side.

Optionally, positioning recesses on the first side of the diffusion plate comprise two first positioning recesses, the two first positioning recesses are arranged symmetrically at two sides of a centerline of the diffusion plate parallel to the third side, and a side of each of the first positioning recesses away from the centerline of the diffusion plate parallel to the third side is provided with a second positioning recess; first gaps of the first positioning recesses are provided between sidewalls of the first positioning recesses close to the centerline of the diffusion plate parallel to the third side and sidewalls of the corresponding positioning inserts close to the centerline of the diffusion plate parallel to the third side, first gaps of the second positioning recesses are provided between sidewalls of the second positioning recesses close to the centerline of the diffusion plate parallel to the third side and sidewalls of the corresponding positioning inserts close to the centerline of the diffusion plate parallel to the third side, and the first gaps of the first positioning recesses are smaller than the first gaps of the second positioning recesses;

positioning recesses on the third side of the diffusion plate comprise two third positioning recesses, the two third positioning recesses are arranged symmetrically at two sides of a centerline of the diffusion plate parallel to the first side, and a side of each of the third positioning recesses away from the centerline of the diffusion plate parallel to the first side is provided with a fourth positioning recess; and first gaps of the third positioning recesses are provided between sidewalls of the third positioning recesses close to the centerline of the diffusion plate parallel to the first side and sidewalls of the corresponding positioning inserts close to the centerline of the diffusion plate parallel to the first side, first gaps of the fourth positioning recesses are provided between sidewalls of the fourth positioning recesses close to the centerline of the diffusion plate parallel to the first side and sidewalls of the corresponding positioning inserts close to the centerline of the diffusion plate parallel to the first side, and the first gaps of the third positioning recesses are smaller than the first gaps of the fourth positioning recesses.

Optionally, in the positioning recesses on the first side of the diffusion plate:

second gaps of the first positioning recesses are provided between sidewalls of the first positioning recesses away from the centerline of the diffusion plate parallel to the third side and sidewalls of the corresponding positioning inserts away from the centerline of the diffusion plate parallel to the third side, second gaps of the second positioning recesses are provided between sidewalls of the second positioning recesses away from the centerline of the diffusion plate parallel to the third side and sidewalls of the corresponding positioning inserts away from the centerline of the diffusion plate parallel to the third side, third gaps of the first positioning recesses are provided between bottom walls of the first positioning recesses and sidewalls of positioning inserts facing bottoms of the first positioning recesses, and third gaps of the second positioning recesses are provided between bottom walls of the second positioning recesses and sidewalls of positioning inserts facing bottoms of the second positioning recesses; and in the positioning recesses on the third side of the diffusion plate:

second gaps of the third positioning recesses are provided between sidewalls of the third positioning recesses away from a centerline of the diffusion plate and sidewalls of the corresponding positioning inserts away from the centerline of the diffusion plate parallel to the first side, second gaps of the fourth positioning recesses are provided between sidewalls of the fourth positioning recesses away from the centerline of the diffusion plate parallel to the first side and sidewalls of the corresponding positioning inserts away from the centerline of the diffusion plate parallel to the first side, third gaps of the third positioning recesses are provided between bottom walls of the third positioning recesses and sidewalls of positioning inserts facing bottoms of the third positioning recesses, and third gaps of the fourth positioning recesses are provided between bottom walls of the fourth positioning recesses and sidewalls of positioning inserts facing bottoms of the fourth positioning recesses.

Optionally, in the positioning recesses on the first side of the diffusion plate:

the first gaps between the first positioning recesses and the corresponding positioning inserts are 0.15 mm-0.2 mm;

the second gaps between the first positioning recesses and the corresponding positioning inserts are 0.2 mm-0.25 mm;

the third gaps between the first positioning recesses and the corresponding positioning inserts are 2.1 mm-2.5 mm;

the first gaps between the second positioning recesses and the corresponding positioning inserts are 3.0 mm-3.5 mm;

the second gaps between the second positioning recesses and the corresponding positioning inserts are 1.0 mm-1.5 mm; and the third gaps between the second positioning recesses and the corresponding positioning inserts are 2.1 mm-2.5 mm; and in the positioning recesses on the third side of the diffusion plate:

the first gaps between the third positioning recesses and the corresponding positioning inserts are 0.15 mm-0.2 mm;

the second gaps between the third positioning recesses and the corresponding positioning inserts are 0.2 mm-0.25 mm;

the third gaps between the third positioning recesses and the corresponding positioning inserts are 3.5 mm-4.0 mm;

the first gaps between the fourth positioning recesses and the corresponding positioning inserts are 2.0 mm-2.5 mm;

the second gaps between the fourth positioning recesses and the corresponding positioning inserts are 1.0 mm-1.5 mm; and the third gaps between the fourth positioning recesses and the corresponding positioning inserts are 3.5 mm-4.0 mm.

Optionally, the backlight module further includes a plurality of parallel light bars, wherein the light bars are on a side facing the reflective plate, of the back panel, each of the light bars is provided with a plurality of lamp beads arranged at intervals, the lamp beads on two adjacent light bars correspond one-to-one to each other in a direction perpendicular to an extension direction of the light bars, and a connection line of the two lamp beads corresponding oneto-one to each other is perpendicular to the extension direction of the light bars; and the lamp beads penetrate through avoidance holes on the reflective plate, a side facing the diffusion plate, of the reflective plate is provided with a plurality of supporting assemblies for supporting the diffusion plate, and the supporting assemblies are at midpoints of connection lines of two lamp beads corresponding one-to-one to each other in the two adjacent light bars.

The present disclosure further provides the display apparatus, which includes any one of the backlight modules in the solution.

DETAILED DESCRIPTION OF THE EMBODIMENTS

The technical solutions in embodiments of the present disclosure are clearly and completely described below with reference to the accompanying drawings in the embodiments of the present disclosure. Apparently, the described embodiments are merely a part rather than all of the embodiments of the present disclosure. Based on the embodiments of the present disclosure, all other embodiments obtained by those of ordinary skill in the art without making creative efforts fall within the scope of protection of the present disclosure.

Figure 1:
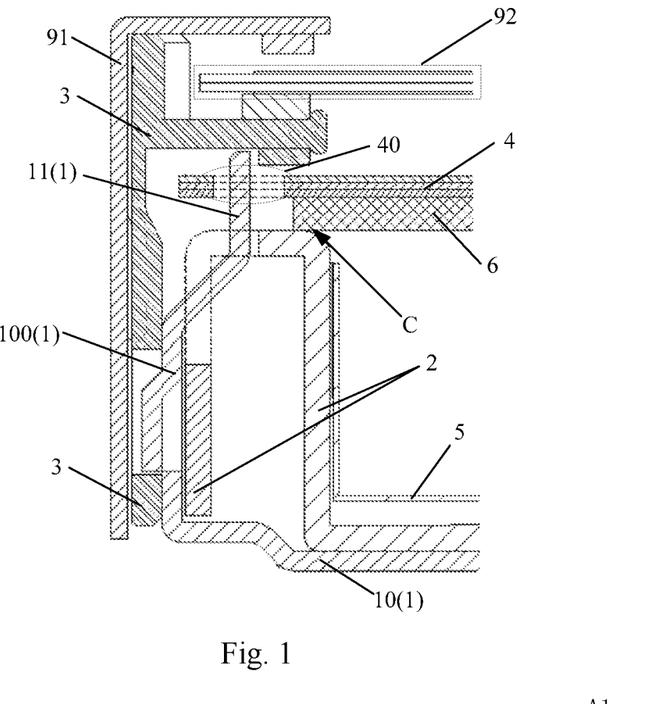
FIG. 1 is a structural schematic diagram showing fixation of a film layer in a backlight module provided in an embodiment of the present disclosure.
Figure 2:
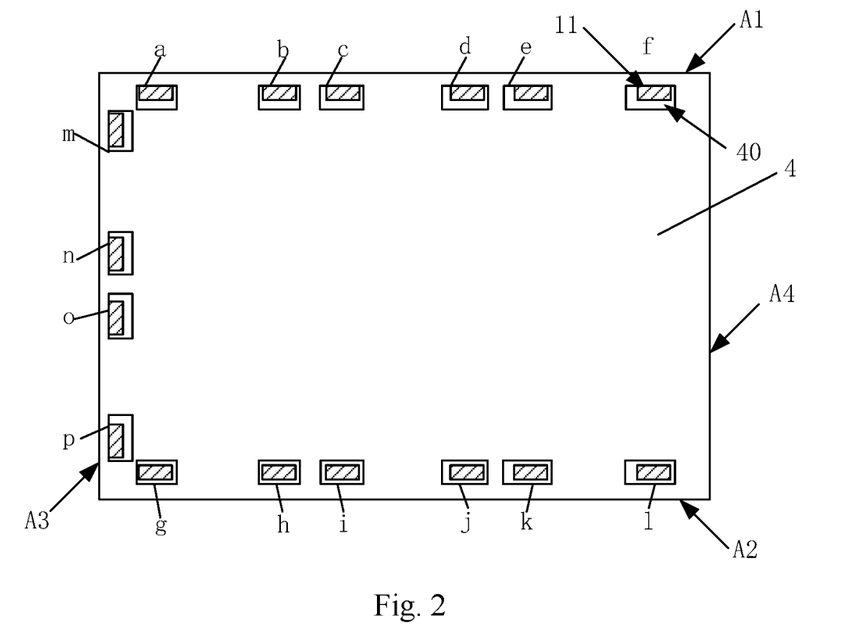
FIG. 2 is a schematic diagram showing distribution of hanging holes on a film layer in a backlight module provided in an embodiment of the present disclosure.

As shown in FIGS. 1-10, some embodiments of the present disclosure provide a backlight module. The backlight module includes:

a back panel 1, where the back panel 1 includes a bottom plate 10 and a side plate 100 formed at a periphery of the bottom plate 10, and the back panel 1 is provided with a plurality of hanging elements 11;

a first middle frame 2, where the first middle frame 2 is located at one side of the back panel 1, and a surface of the first middle frame 2 away from the bottom plate 10 is provided with a bearing surface C for supporting a film layer 4;

a second middle frame 3, where a side of the second middle frame 3 away from the film layer 4 is provided with a supporting part for supporting a display panel 92; and the film layer 4, where the film layer 4 is located at a side of the first middle frame 2 away from the back panel 1, the film layer 4 is provided with a first side A1, a second side A2, a third side A3, and a fourth side A4, the first side A1 is opposite the second side A2, the third side A3 is opposite the fourth side A4, the third side A3 and the fourth side A4 are located between the first side A1 and the second side A2 and are connected to the first side A1 and the second side A2, a plurality of hanging holes 40 are provided at edges of the film layer 4 corresponding to the first side A1 and to the third side A3, the hanging holes 40 correspond one-to-one to the hanging elements 11, in each set of hanging hole 40 and hanging element 11 corresponding to each other, the film layer 4 is connected to the back panel 1 via the hanging hole 40 of the hanging element 11, in each set of hanging hole 40 and hanging element 11 corresponding to each other on the first side A1, a first gap is provided between a sidewall of the hanging element 11 away from the fourth side A4 and a sidewall of the hanging hole 40 away from the fourth side A4, and from the third side A3 to the fourth side A4, the first gaps between the hanging holes 40 and hanging elements 11 corresponding to each other gradually increase; and in each set of hanging hole 40 and hanging element 11 corresponding to each other on the third side A3, a first gap is provided between a sidewall of the hanging element 11 away from the second side A2 and a sidewall of the hanging hole 40 away from the second side A2, and from the first side A1 to the second side A2, the first gaps between the hanging holes 40 and hanging elements 11 corresponding to each other gradually increase.

Figure 3:
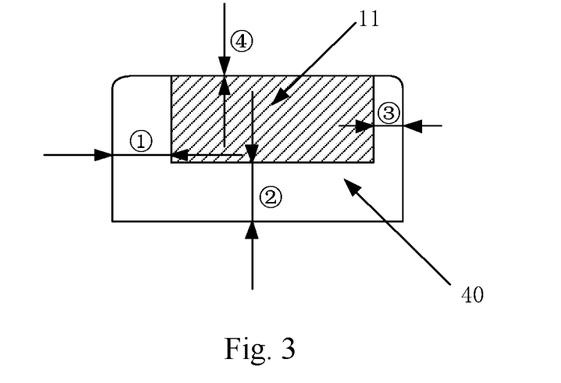
FIG. 3 is a schematic diagram showing matching of hanging holes on a first side of a film layer and corresponding hanging elements in a backlight module provided in an embodiment of the present disclosure.
Figure 5:
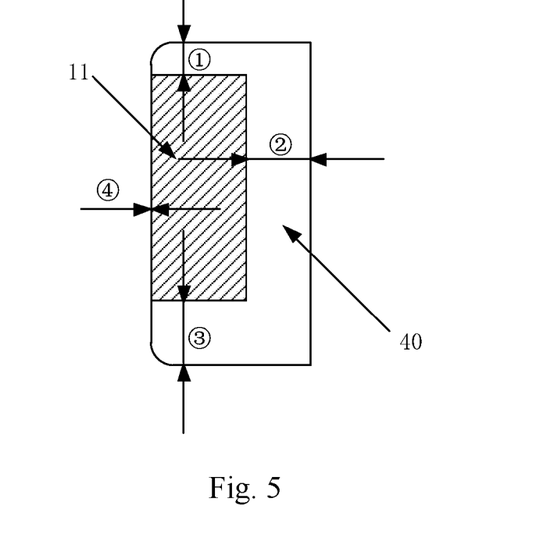
FIG. 5 is a schematic diagram showing matching of hanging holes on a third side of a film layer and corresponding hanging elements in a backlight module provided in an embodiment of the present disclosure.

In the backlight module, a portion of an edge of the film layer 4 between the bearing surface and the supporting part is provided with the hanging holes 40 corresponding one-to-one to the hanging elements 11 on the back panel 1, so as to fix the film layer 4. Optionally, the film layer 4 is rectangular, which has the first side A1 and the second side A2 opposite each other as well as the third side A3 and the fourth side A4 opposite each other, and the first side A1 and the third side A3 are provided with a plurality of hanging holes 40; the back panel 1 is provided with hanging elements 11 corresponding one-to-one to the hanging holes 40 and penetrating through the corresponding hanging holes 40; in each set of hanging hole 40 and hanging element 11 corresponding to each other on the first side A1, a first gap between a sidewall of the hanging element 11 away from the fourth side A4 and a sidewall of the hanging hole 40 away from the fourth side A4 gradually increases from the third side A3 to the fourth side A4; in each set of hanging hole 40 and hanging element 11 corresponding to each other on the third side A3, a first gap between a sidewall of the hanging element 11 away from the second side A2 and a sidewall of the hanging hole 40 away from the second side A2 gradually increases from the first side A1 to the second side A2; when the backlight module is used horizontally, the first side A1, the second side A2, the third side A3 and the fourth side A4 of the film layer 4 are a top side, a bottom side, a left side and a right side respectively, during heating expansion, with the hanging hole 40 on the first side A1 of the film layer 4 close to the third side A3 as an example, the hanging hole 40 expands to the left side along with the film layer 4 until the hanging hole 40 on the third side A3 of the film layer 4 abuts against the corresponding hanging element 11, leftward expansion of the hanging hole 40 on the first side A1 close to the third side A3 is limited by the hanging element 11 corresponding to the hanging hole 40 on the third side A3, and the hanging hole 40 on the first side A1 close to the third side A3 may only expand rightward; with the hanging hole 40 on the first side A1 close to the fourth side A4 of the film layer 4 as an example, the hanging hole 40 expands to the right side along with the film layer 4; from the third side A3 to the fourth side A4, in each set of hanging hole 40 and hanging element 11 corresponding to each other on the first side A1, the first gap between the sidewall of the hanging element 11 away from the fourth side A4 and the sidewall of the hanging hole 40 away from the fourth side A4 needs to be adapted to expansion of the hanging hole 40 at the left side and expansion of the hanging element, such that from the third side A3 to the fourth side A4, first gaps between the hanging holes 40 and hanging elements 11 corresponding to each other gradually increase; and the film layer expands downwards under gravity in a vertical direction. When the backlight module is used vertically, the third side A3, the fourth side A4, the second side A2 and the first side A1 of the film layer 4 are a top side, a bottom side, a left side and a right side respectively, during heating expansion, with the hanging hole 40 on the third side A3 of the film layer 4 close to the first side A1 as an example, the hanging hole 40 expands to the right side along with the film layer 4 until the hanging hole 40 on the first side A1 of the film layer 4 abuts against the corresponding hanging element 11, rightward expansion of the hanging hole 40 on the third side A3 close to the first side A1 is limited by the hanging element 11 corresponding to the hanging hole 40 on the first side A1, and the hanging hole 40 on the first side A1 close to the third side A3 may only expand leftward; with the hanging hole 40 on the third side A3 close to the second side A2 of the film layer 4 as an example, the hanging hole 40 expands to the left side along with the film layer 4; from the first side A1 to the second side A2, in each set of hanging hole 40 and hanging element 11 corresponding to each other on the third side A3, the first gap between the sidewall of the hanging element 11 away from the second side A2 and the sidewall of the hanging hole 40 away from the second side A2 needs to be adapted to expansion of the hanging hole 40 at the right side and expansion of the hanging element, such that from the first side A1 to the second side A2, first gaps between the hanging holes 40 and hanging elements 11 corresponding to each other gradually increase; and the film layer expands downwards under gravity in a vertical direction.

Therefore, when the backlight module is used horizontally or vertically, hanging holes of the film layer may be well adapted to expansion of the film layer.

In some embodiments, an overall structure of the film layer 4 may use an integrated structure consisting of diffusion+prism+diffusion, with consistent models of upper and lower diffusion, and a thickness is 0.40 t-0.43 t, optionally 0.415 t; and a haze is 93%-97%, preferably 95%. A prism has a thickness of 0.40 t-0.45 t, optionally 0.43 t, a gain is 1.6-1.7, optionally 1.65, and a haze is 90%-95%, preferably 93%. A high thickness may ensure that the backlight module is not prone to plate wrinkling and other defects in a high temperature and high humidity environment, and has high reliability. A high haze may improve a shielding property of the film layer 4, thus reducing a light mixing distance and the number of lamp beads 71, which is conducive to reduction of a thickness and design cost of the backlight module. A film in the film layer 4 is fixed by hanging lugs, and each of the hanging lugs is provided with a hanging hole 40.

In some embodiments, each of the first side A1 and the second side A2 is provided with 6 hanging lugs, which are a-f and g-l, and the third side A3 is provided with 4 hanging lugs, which are m-p. To meet a requirement of horizontal and vertical compatibility, computation is conducted according to a maximum thermal expansion coefficient 16.01 μm/m° C. of three film layers 4, and a specific structure of the hanging lugs of the film layers 4 is as follows.

Optionally, in each set of hanging hole 40 and hanging element 11 corresponding to each other on the first side A1, a second gap is provided between a sidewall of the hanging element 11 away from the first side A1 and a sidewall of the hanging hole 40 away from the first side A1, a third gap is provided between a sidewall of the hanging element 11 away from the third side A3 and a sidewall of the hanging hole 40 away from the third side A3, a fourth gap is provided between a sidewall of the hanging element 11 away from the second side A2 and a sidewall of the hanging hole 40 away from the second side A2, and the second gaps, the third gaps and the fourth gaps between the hanging holes 40 and hanging elements 11 corresponding to each other are equal separately, that is, the second gaps between the hanging holes 40 and hanging elements 11 corresponding to each other on the first side A1 are equal, the third gaps between the hanging holes 40 and hanging elements 11 corresponding to each other on the first side A1 are equal, and the fourth gaps between the hanging holes 40 and hanging elements 11 corresponding to each other on the first side A1 are equal.

Optionally, in each set of hanging hole 40 and hanging element 11 corresponding to each other on the first side A1: in a direction from the third side A3 to the fourth side A4, the first gaps between the hanging holes 40 and hanging elements 11 corresponding to each other linearly and gradually increase.

Optionally, in each set of hanging hole 40 and hanging element 11 corresponding to each other on the first side A1: the second gap between the hanging hole 40 and the hanging element 11 corresponding to each other is 0.4 mm-0.6 mm, the third gap between the hanging hole 40 and the hanging element 11 corresponding to each other is 0.45 mm-0.55 mm, and the fourth gap between the hanging hole 40 and the hanging element 11 corresponding to each other is 0 mm.

It is to be noted that when the backlight module is used horizontally, the first side A1, the second side A2, the third side A3 and the fourth side A4 of the film layer 4 are a top side, a bottom side, a left side and a right side respectively, and a sidewall of a hanging hole 40 at the top side away from the bottom side makes direct contact with a sidewall of a corresponding hanging element 11 away from the bottom side, thus limiting the film layer 4 at the top side.

An arrangement mode of hanging lugs of the first side A1: in each set of hanging hole 40 and hanging element 11 corresponding to each other on the first side A1, in a direction from the third side A3 to the fourth side A4, gaps ① between the sidewall of the hanging element 11 away from the fourth side A4 and the sidewall of the hanging hole 40 away from the fourth side A4 are 0.5 mm, 0.7 mm, 0.9 mm, 1.1 mm, 1.3 mm, and 1.5 mm from a to f; gaps ② between the sidewall of the hanging element 11 away from the first side A1 and the sidewall of the hanging hole 40 away from the first side A1 are all set as 0.4 mm-0.6 mm, which may be, but not limited to, 0.4 mm, 0.5 mm, or 0.6 mm; gaps ③ between the sidewall of the hanging element 11 away from the third side A3 and the sidewall of the hanging hole 40 away from the third side A3 are 0.5 mm; and the sidewall of the hanging element 11 away from the second side A2 makes contact with and is connected to the sidewall of the hanging hole 40 away from the second side A2 in a hanging manner, and gaps ④ between the sidewall of the hanging element 11 away from the second side A2 and the sidewall of the hanging hole 40 away from the second side A2 are 0 mm under an ideal condition.

Optionally, in each set of hanging hole 40 and hanging element 11 corresponding to each other on the third side A3, a second gap is provided between a sidewall of the hanging element 11 away from the third side A3 and a sidewall of the hanging hole 40 away from the third side A3, a third gap is provided between a sidewall of the hanging element 11 away from the first side A1 and a sidewall of the hanging hole 40 away from the first side A1, a fourth gap is provided between a sidewall of the hanging element 11 away from the fourth side A4 and a sidewall of the hanging hole 40 away from the fourth side A4, and the second gaps, the third gaps and the fourth gaps between the hanging holes 40 and hanging elements 11 corresponding to each other are equal separately, that is, the second gaps between the hanging holes 40 and hanging elements 11 corresponding to each other on the third side A3 are equal, the third gaps between the hanging holes 40 and hanging elements 11 corresponding to each other on the third side A3 are equal, and the fourth gaps between the hanging holes 40 and hanging elements 11 corresponding to each other on the third side A3 are equal.

Optionally, in each set of hanging hole 40 and hanging element 11 corresponding to each other on the third side A3: in a direction from the first side A1 to the second side A2, the first gaps between the hanging holes 40 and hanging elements 11 corresponding to each other linearly and gradually increase.

Optionally, in each set of hanging hole 40 and hanging element 11 corresponding to each other on the third side A3: the second gap between the hanging hole 40 and the hanging element 11 corresponding to each other is 0.4 mm-0.6 mm, the third gap between the hanging hole 40 and the hanging element 11 corresponding to each other is 0.45 mm-0.55 mm, and the fourth gap between the hanging hole 40 and the hanging element 11 corresponding to each other is 0 mm.

An arrangement mode of hanging lugs of the third side A3: among hanging holes 40 and hanging elements 11 corresponding one-to-one to each other on the third side A3, in a direction from the first side A1 to the second side A2, gaps ① between the sidewalls of the hanging elements 11 away from the second side A2 and the sidewalls of the hanging holes 40 away from the second side A2 are 0.5 mm, 0.7 mm, 0.9 mm and 1.1 mm from m to p; gaps ② between the sidewalls of the hanging elements 11 away from the third side A3 and the sidewalls of the hanging holes 40 away from the third side A3 are 0.4 mm-0.6 mm, which may be, but not limited to, 0.4 mm, 0.5 mm, or 0.6 mm; gaps ③ between the sidewalls of the hanging elements 11 away from the first side A1 and the sidewalls of the hanging holes 40 away from the first side A1 are 0.5 mm; and the sidewalls of the hanging elements 11 away from the fourth side A4 make contact with and are connected to the sidewalls of the hanging holes 40 away from the fourth side A4 in a hanging manner, and gaps ④ between the sidewalls of the hanging elements 11 away from the fourth side A4 and the sidewalls of the hanging holes 40 away from the fourth side A4 are 0 mm under an ideal condition.

Figure 4:
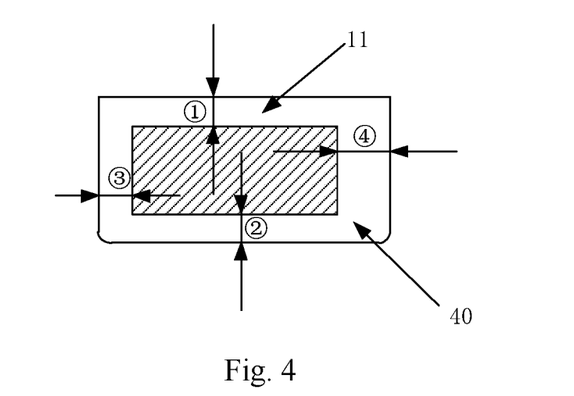
FIG. 4 is a schematic diagram showing distribution of the hanging holes on the film layer in the backlight module as shown in FIG. 2, and is a schematic diagram showing matching of hanging holes on a second side of a film layer and corresponding hanging elements in a module.

Optionally, a plurality of hanging holes 40 are provided at an edge of the film layer 4 corresponding to the second side A2, hanging elements 11 corresponding one-to-one to the hanging holes 40 are provided on the back panel 1, and in each set of hanging hole 40 and hanging element 11 corresponding to each other, the hanging element 11 is connected to the film layer 4 via the hanging hole 40; and in each set of hanging hole 40 and hanging element 11 corresponding to each other on the second side A2, a first gap is provided between the sidewall of the hanging element 11 away from the second side A2 and the sidewall of the hanging hole 40 away from the second side A2, a second gap is provided between a sidewall of the hanging element 11 away from the first side A1 and a sidewall of the hanging hole 40 away from the first side A1, a third gap is provided between a sidewall of the hanging element 11 away from the fourth side A4 and a sidewall of the hanging hole 40 away from the fourth side A4, and a fourth gap is provided between a sidewall of the hanging element 11 away from the third side A3 and a sidewall of the hanging hole 40 away from the third side A3.

Optionally, in each set of hanging hole 40 and hanging element 11 corresponding to each other on the second side A2: the first gaps between the hanging holes 40 and hanging elements 11 corresponding to each other are equal, the second gaps between the hanging holes 40 and hanging elements 11 corresponding to each other are equal, in a direction from the third side A3 to the fourth side A4, the third gaps between the hanging holes 40 and hanging elements 11 corresponding to each other gradually increase, and the fourth gaps between the hanging holes 40 and hanging elements 11 corresponding to each other are equal.

Optionally, in each set of hanging hole 40 and hanging element 11 corresponding to each other on the second side A2: the first gap between the hanging hole 40 and the hanging element 11 corresponding to each other is 1 mm-1.5 mm, the second gap between the hanging hole 40 and the hanging element 11 corresponding to each other is 0.4 mm-0.6 mm, in a direction from the third side A3 to the fourth side A4, the third gaps between the hanging holes 40 and hanging elements 11 corresponding to each other linearly and gradually increase, and the fourth gap between the hanging hole 40 and the hanging element 11 corresponding to each other is 0.45 mm-0.55 mm.

An arrangement mode of hanging lugs of the second side A2: in each set of hanging hole 40 and hanging element 11 corresponding to each other on the second side A2, gaps ① between the sidewall of the hanging element 11 away from the second side A2 and the sidewall of the hanging hole 40 away from the second side A2 are 1 mm-1.5 mm, which may be, but not limited to, 1 mm, 1.1 mm, 1.2 mm, 1.3 mm, 1.4 mm or 1.5 mm; gaps ② between the sidewall of the hanging element 11 away from the first side A1 and the sidewall of the hanging hole 40 away from the first side A1 are 0.4 mm-0.6 mm, which may be, but not limited to, 0.4 mm, 0.5 mm, or 0.6 mm; in a direction from the third side A3 to the fourth side A4, gaps ③ between the sidewall of the hanging element 11 away from the fourth side A4 and the sidewall of the hanging hole 40 away from the fourth side A4 are 0.5 mm, 0.7 mm, 0.9 mm, 1.1 mm, 1.3 mm and 1.5 mm from g to l; and gaps ④ between the sidewall of the hanging element 11 away from the third side A3 and the sidewall of the hanging hole 40 away from the third side A3 are 0.5 mm.

When the film layer 4 is used horizontally (hanging lugs a-f are at the top side), gaps ① between the hanging lugs a-f are set as 0, which may limit the top side; gaps ① between the hanging lugs m-p are 0, which may limit the left side; and gaps ④ between hanging lugs of the top side and bottom side are 0.4 mm-0.6 mm, which may limit the right side of the film layer 4. During heating expansion, with hanging lug a as an example, the hanging lug a expands to the left side along with the film layer 4, gaps ④ of the right side of the hanging lugs of the top side and bottom side are small, the hanging hole 40 expands to the left side along with the film layer 4 until the hanging hole 40 of the hanging lug a abuts against the corresponding hanging element 11, and leftward expansion of the film layer 4 is limited, such that the film layer 4 may expand rightward; with hanging lug f as an example, hanging lug f may expand to the right side along with the film layer 4; from the hanging lug a to the hanging lug f, in each set of hanging hole 40 and hanging element 11 corresponding to each other, the first gap between the sidewall of the hanging element 11 away from the fourth side A4 and the sidewall of the hanging hole 40 away from the fourth side A4 needs to be adapted to expansion of the hanging lug at the left side and expansion of the hanging element, such that from the hanging lug a to the hanging lug f, first gaps between the hanging holes 40 and hanging elements 11 corresponding to each other gradually increase; and the film layer expands downwards under gravity in a vertical direction.

When the film layer 4 is used vertically (hanging lugs m-p are at the top side), gaps ① between the hanging lugs m-p are 0, which may limit the top side; gaps ① between the hanging lugs a-f are 0, which may limit the right side; and gaps ② between hanging lugs of the left side and right side are 0.4 mm-0.6 mm, which may limit the right side. During heating expansion, with hanging lug m as an example, the hanging lug m expands to the right side along with the film layer 4, gaps ④ between the hanging lugs m-p of the top side are small, the hanging hole 40 expands to the right side along with the film layer 4 until the hanging hole 40 of the hanging lug m abuts against the corresponding hanging element 11, and rightward expansion of the film layer 4 is limited, such that the film layer 4 may expand leftward; with hanging lug p as an example, and hanging lug p may expand to the left side along with the film layer 4; from the hanging lug m to the hanging lug p, in each set of hanging hole 40 and hanging element 11 corresponding to each other, the first gap between the sidewall of the hanging element 11 away from the second side A2 and the sidewall of the hanging hole 40 away from the second side A2 needs to be adapted to expansion of the hanging lug at the right side and expansion of the hanging element, such that from the hanging lug m to the hanging lug p, first gaps between the hanging holes 40 and hanging elements 11 corresponding to each other gradually increase; and the film layer expands downwards under gravity in a vertical direction.

It is to be noted that expansion is computed according to an expansion coefficient*a distance from a hanging lug to a film layer 4 at a left side*a temperature difference.

Design of hanging lugs and hanging holes 40 of the first side A1 and the second side A2: considering a fit tolerance of the film layer 4 and structural parts, an actual design value may be larger than the sum of expansion and a manufacturing tolerance. Therefore, design values of gaps ③ of the hanging lugs a-f and g-l are 0.5 mm, 0.7 mm, 0.9 mm, 1.1 mm, 1.3 mm and 1.5 mm; and gaps ④ are only reserved assembly tolerances, and are designed to be 0.5 mm.

Design of hanging lugs and hanging holes 40 of the third side A3: considering a fit tolerance of the film layer 4 and structural parts, an actual design value may be larger than the sum of expansion and a manufacturing tolerance. Therefore, design values of gaps ③ of the hanging lugs m-p are 0.5 mm, 0.7 mm, 0.9 mm and 1.1 mm; and gaps ④ are only reserved assembly tolerances, and are designed to be 0.5 mm according to a certain reserved fit tolerances.

Figure 6:
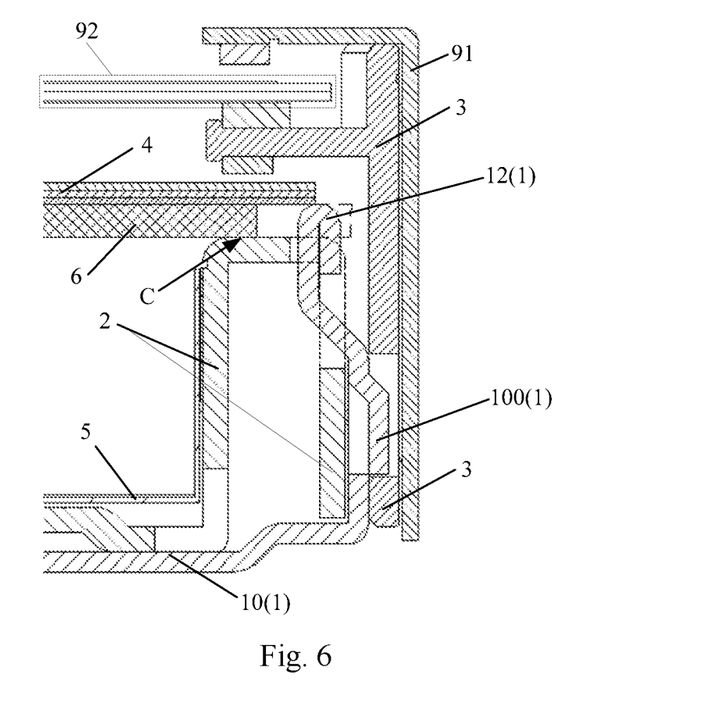
FIG. 6 is a structural schematic diagram showing positioning of a diffusion plate in a backlight module provided in an embodiment of the present disclosure.
Figure 7:
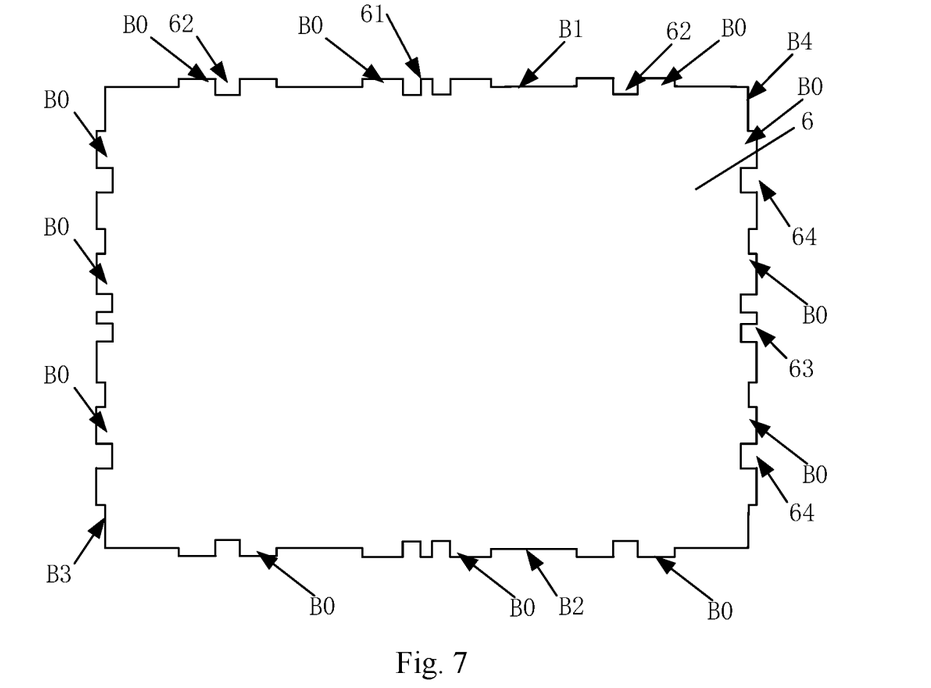
FIG. 7 is a schematic diagram showing distribution of positioning recesses on a diffusion plate in a backlight module provided in an embodiment of the present disclosure.

Optionally, the backlight module further includes a reflective plate 5 and a diffusion plate 6; the reflective plate 5 is located between the back panel 1 and the film layer 4; the diffusion plate 6 is located between the reflective plate 5 and the film layer 4, and a side of the diffusion plate 6 away from the film layer 4 makes contact with the bearing surface C; the diffusion plate 6 is provided with a first side B1, a second side B2, a third side B3, and a fourth side B4, in the diffusion plate 6, the first side B1 is opposite the second side B2, the third side B3 is opposite the fourth side B4, the third side B3 and the fourth side B4 are located between the first side B1 and the second side B2 and are connected to the first side B1 and the second side B2; edges corresponding to the first side B1 and the third side B3 of the diffusion plate 6 are both provided with a plurality of positioning recesses; and the back panel 1 is provided with positioning inserts 12 corresponding one-to-one to the positioning recesses, and in each set of positioning recess and positioning insert 12 corresponding to each other, the positioning insert 12 is clamped into the positioning recess so as to be positioned in the diffusion plate 6 in an inserted manner.

Optionally, an edge corresponding to the second side B2 of the diffusion plate 6 is provided with a plurality of positioning recesses, and the plurality of positioning recesses on the second side B2 of the diffusion plate 6 and the plurality of positioning recesses on the first side B1 of the diffusion plate 6 are arranged symmetrically with respect to a centerline of the diffusion plate 6 parallel to the first side B1; and/or an edge corresponding to the fourth side B4 of the diffusion plate 6 is provided with a plurality of positioning recesses, and the plurality of positioning recesses on the fourth side B4 of the diffusion plate 6 and the plurality of positioning recesses on the third side B3 of the diffusion plate 6 are arranged symmetrically with respect to a centerline of the diffusion plate 6 parallel to the third side B3.

Figure 8:
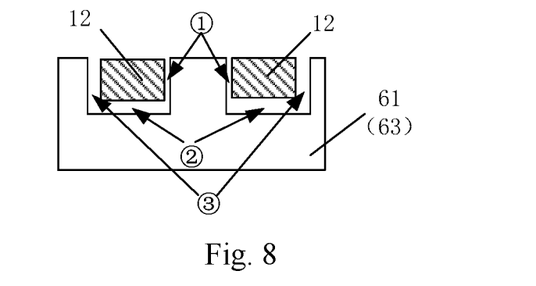
FIG. 8 is a schematic diagram showing matching of first positioning recesses (third positioning recesses) on a diffusion plate and corresponding positioning inserts in a backlight module provided in an embodiment of the present disclosure.
Figure 9:
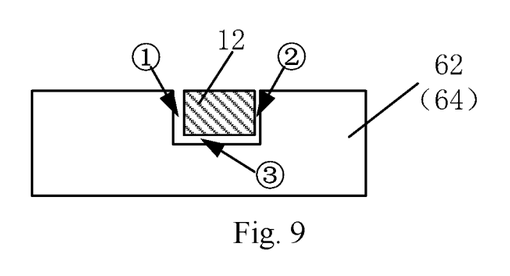
FIG. 9 is a schematic diagram showing matching of second positioning recesses (fourth positioning recesses) on a diffusion plate and corresponding positioning inserts in a backlight module provided in an embodiment of the present disclosure.

Optionally, positioning recesses on the first side B1 of the diffusion plate 6 include two first positioning recesses 61, the two first positioning recesses are arranged symmetrically at two sides of a centerline of the diffusion plate parallel to the third side B3, and a side of each of the first positioning recesses 61 away from the centerline of the diffusion plate 6 parallel to the third side B3 is provided with a second positioning recess 62; first gaps are provided between sidewalls of the first positioning recesses 61 close to the centerline of the diffusion plate 6 parallel to the third side B3 and sidewalls of the corresponding positioning inserts 12 close to a centerline of the diffusion plate 6, first gaps are provided between sidewalls of the second positioning recesses 62 close to the centerline of the diffusion plate 6 parallel to the third side B3 and sidewalls of the corresponding positioning inserts 12 close to a centerline of the diffusion plate 6, and the first gaps between the first positioning recesses 61 and the corresponding positioning inserts 12 are smaller than the first gaps between the second positioning recesses 62 and the corresponding positioning inserts 12.

The positioning recesses on the third side B3 of the diffusion plate 6 include two third positioning recesses 63, the two third positioning recesses 63 are arranged symmetrically at two sides of a centerline of the diffusion plate 6 parallel to the first side B1, and a side of each of the third positioning recesses 63 away from the centerline of the diffusion plate 6 parallel to the first side B1 is provided with a fourth positioning recess 64; and first gaps are provided between sidewalls of the third positioning recesses 63 close to the centerline of the diffusion plate 6 parallel to the first side B1 and sidewalls of the corresponding positioning inserts 12 close to the centerline of the diffusion plate 6 parallel to the first side B1, first gaps are provided between sidewalls of the third positioning recesses 64 close to a centerline of the diffusion plate 6 and sidewalls of the corresponding positioning inserts 12 close to the centerline of the diffusion plate 6 parallel to the first side B1, and the first gaps between the third positioning recesses 63 and the corresponding positioning inserts 12 are smaller than the first gaps between the fourth positioning recesses 64 and the corresponding positioning inserts 12.

Optionally, in the positioning recesses on the first side B1 of the diffusion plate 6:

second gaps are provided between sidewalls of the first positioning recesses 61 away from the centerline of the diffusion plate 6 parallel to the third side B3 and sidewalls of the corresponding positioning inserts 12 away from the centerline of the diffusion plate 6 parallel to the third side B3, second gaps are provided between sidewalls of the second positioning recesses 62 away from the centerline of the diffusion plate 6 parallel to the third side B3 and sidewalls of the corresponding positioning inserts 12 away from the centerline of the diffusion plate 6 parallel to the third side B3, third gaps are provided between bottom walls of the first positioning recesses 61 and sidewalls of positioning inserts 12 facing bottoms of the first positioning recesses 61, and third gaps are provided between bottom walls of the second positioning recesses 62 and sidewalls of positioning inserts 12 facing bottoms of the second positioning recess 62; and in the positioning recesses on the third side B3 of the diffusion plate 6:

second gaps are provided between sidewalls of the third positioning recesses 63 away from the centerline of the diffusion plate 6 parallel to the first side B1 and sidewalls of the corresponding positioning inserts 12 away from the centerline of the diffusion plate 6 parallel to the first side B1, second gaps are provided between sidewalls of the fourth positioning recesses 64 away from the centerline of the diffusion plate 6 parallel to the first side B1 and sidewalls of the corresponding positioning inserts 12 away from the centerline of the diffusion plate 6 parallel to the first side B1, third gaps are provided between bottom walls of the third positioning recesses 63 and sidewalls of positioning inserts 12 facing bottoms of the third positioning recesses 63, and third gaps are provided between bottom walls of the fourth positioning recesses 64 and sidewalls of positioning inserts 12 facing bottoms of the fourth positioning recesses 64.

Optionally, in the positioning recesses on the first side B1 of the diffusion plate 6:

the first gaps between the first positioning recesses 61 and the corresponding positioning inserts 12 are 0.15 mm-0.2 mm;

the second gaps between the first positioning recesses 61 and the corresponding positioning inserts 12 are 0.2 mm-0.25 mm;

the third gaps between the first positioning recesses 61 and the corresponding positioning inserts 12 are 2.1 mm-2.5 mm;

the first gaps between the second positioning recesses 62 and the corresponding positioning inserts 12 are 3.0 mm-3.5 mm;

the second gaps between the second positioning recesses 62 and the corresponding positioning inserts 12 are 1.0 mm-1.5 mm; and the third gaps between the second positioning recesses 62 and the corresponding positioning inserts 12 are 2.1 mm-2.5 mm; and in the positioning recesses on the third side B3 of the diffusion plate 6:

the first gaps between the third positioning recesses 63 and the corresponding positioning inserts 12 are 0.15 mm-0.2 mm;

the second gaps between the third positioning recesses 63 and the corresponding positioning inserts 12 are 0.2 mm-0.25 mm;

the third gaps between the third positioning recesses 63 and the corresponding positioning inserts 12 are 3.5 mm-4.0 mm;

the first gaps between the fourth positioning recesses 64 and the corresponding positioning inserts 12 are 2.0 mm-2.5 mm;

the second gaps between the fourth positioning recesses 64 and the corresponding positioning inserts 12 are 1.0 mm-1.5 mm; and the third gaps between the fourth positioning recesses 64 and the corresponding positioning inserts 12 are 3.5 mm-4.0 mm.

In some embodiments, the diffusion plate 6 is positioned through matching of the positioning inserts 12 on the back panel 1 and convex lugs B0 on the diffusion plate 6. As shown in FIG. 7, the top side, bottom side, left side and right side are each provided with 3 convex lugs B0, each of convex lugs B0 is provided with a positioning recess. The positioning recesses (a first positioning recess set consisting of two first positioning recesses 61 or a third positioning recess set consisting of two third positioning recesses 63) provided on the convex lugs B0 at centerlines of the four sides are subjected to fine positioning, with a gap of 0.2 mm-0.5 mm, the positioning recesses (the second positioning recesses 62 or the fourth positioning recesses 64) provided on the other convex lugs B0 are subjected to coarse positioning, and positioning structures of the sky, ground, left and right sides are completely symmetrical. Overall size of the diffusion plate 6: 2167 mm*1224.2 mm, and an expansion coefficient of polystyrene (PS) is $6.8*10^{-5}$ cm/cm·° C.

An expansion computation formula: P=L*expansion coefficient*temperature difference, an expansion coefficient of the diffusion plate 6 is $6.8*10^{-5}$ cm/cm·° C., and a temperature difference is 35° C. The first positioning recesses 61 and the third positioning recesses 63 in the diffusion plate 6 are subjected to fine positioning, and the second positioning recesses 62 and the fourth positioning recesses 64 are subjected to coarse positioning; and the diffusion plate 6 is positioned in the center of the top side, bottom side, left side and right side in the case of fine positioning, and is positioned at two sides of a position of fine positioning in the case of coarse positioning.

Setting of fine positioning gaps: for all fine positioning, gaps ①=0.15 mm, and gaps ②=0.2 mm.

An expansion coefficient of longer sides of the diffusion plate 6: $6.8*10^{-5}$ cm/cm·° C.*216.7 cm*35° C.*10 mm/cm=5.23 mm.

An expansion coefficient of shorter sides of the diffusion plate 6: $6.8*10^{-5}$ cm/cm·° C.*122.4 cm*35° C.*10 mm/cm=2.96 mm.

Regarding the first positioning recesses 61, an expansion coefficient of 2.96 mm of shorter sides is considered, a cutting tolerance is ±1 mm, an assembly tolerance of 0.2 mm is reserved, and gaps ③=2.1 mm; and similarly, gaps ③ of the second positioning recesses 62 are 2.1 mm.

Regarding the third positioning recesses 63, an expansion coefficient of 5.23 mm of longer sides is considered, a cutting tolerance is ±1.5 mm, an assembly tolerance of 0.2 mm is reserved, and gaps ③=3.5 mm; and similarly, gaps ③ of the fourth positioning recesses 64 are 3.5 mm.

An expansion coefficient of the second positioning recess 62 located at the left side of the first positioning recess 61: $6.8*10^{-5}$ cm/cm·° C.*68 cm*35° C.*10 mm/cm=1.64 mm, and an enough assembly tolerance is reserved.

Gaps ① are set as 3.0 mm, and considering an enough assembly tolerance, gaps ① are set as 1.0 mm; and similarly, regarding the second positioning recess 62 located at the right side of the first positioning recess 61, the gap ① is set as 3.0 mm and the gap ② is set as 1.0 mm.

An expansion coefficient of the fourth positioning recess 64 located above the third positioning recess 63: $6.8*10^{-5}$ cm/cm·° C.*25.6 cm*35° C.*10 mm/cm=0.618 mm, an enough assembly tolerance is reserved, gaps ① are set as 2.0 mm, and considering an enough assembly tolerance, gaps ② are set as 1.0 mm; and similarly, regarding the fourth positioning recess 64 located below the third positioning recess 63, the gap ① is set as 2.0 mm and the gap ② is set as 1.0 mm.

Figure 10:
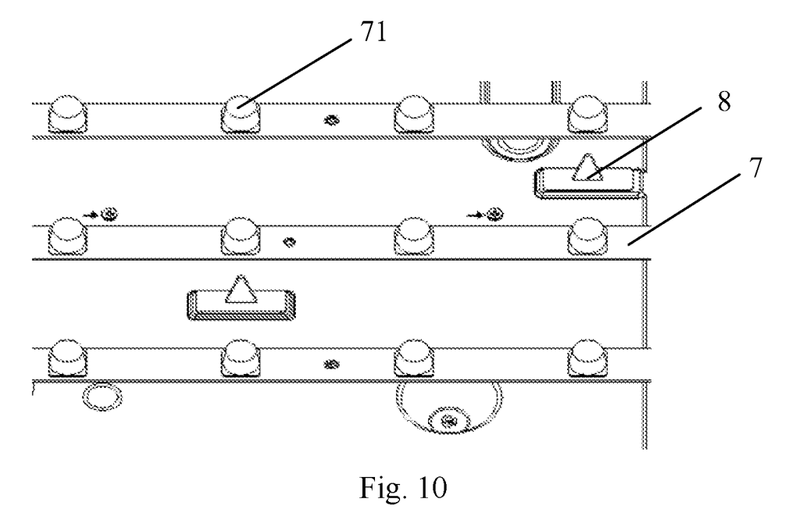
FIG. 10 is a structural schematic diagram showing supporting of a diffusion plate in a backlight module provided in an embodiment of the present disclosure.

Optionally, the backlight module further includes a plurality of parallel light bars 7, where the light bars 7 are located on a side of the back panel 1 facing the reflective plate 5, each of the light bars 7 is provided with a plurality of lamp beads 71 arranged at intervals, in a direction perpendicular to an extension direction of the light bars 7, the lamp beads 71 on the two adjacent light bars 7 correspond one-to-one to each other, and a connection line of the two lamp beads 71 corresponding one-to-one to each other is perpendicular to the extension direction of the light bars 7; and the lamp beads 71 penetrate through avoidance holes on the reflective plate 5, a side of the reflective plate 5 facing the diffusion plate 6 is provided with a plurality of supporting assemblies 8 for supporting the diffusion plate 6, and the supporting assemblies 8 are located at midpoints of connection lines of the two lamp beads 71 corresponding one-to-one to each other in the two adjacent light bars 7.

It is to be noted that the diffusion plate 6 is supported by the supporting assemblies 8. The supporting assemblies 8 include transparent triangular supports and pure white bases under the supports in appearance, and are each placed between two lamps, a plate face of the triangular support faces a centerline of the two lamps. Through actual measurement, the arrangement mode may effectively avoid shadows of the supporting assemblies 8, and design of the pure white bases may avoid light leakage at fixed positions of the supporting assemblies 8.

In addition, in some embodiments, the reflective plate 5 has a total thickness of 0.30 t-0.35 t, optionally 0.34 t, and has a reflectivity 98.0%-98.5%, optionally 98.2%. A front surface of the reflective plate is coated with 40 μm of coating particles, thus improving uniformity. A four-section splicing method is used to satisfy a cutting process and reduce the cost. A reflective plate 5 at a side face and a reflective plate 5 at a bottom face use integrated design, so as to reduce assembly difficulty and improve assembly accuracy. The reflective plate 5 is positioned by the light bars 7 and a connector (the lamp beads 71 on the light bars 7 match the avoidance holes on the reflective plate 5 to position the reflective plate 5), and a lower portion of the reflective plate 5 is fixed to the back panel 1 by means of a double sides adhesive tape.

Optionally, as shown in FIGS. 1 and 6, a side of the second middle frame 3 away from the display panel 92 may be further provided with an iron member 91 for improving structural strength of a display apparatus.

Some embodiments of the present disclosure further provide a display apparatus, which includes any one of the backlight modules in the solution.

Based on the same inventive concept, the display apparatus may be mounted horizontally or vertically, thus reducing design cost.

Apparently, those skilled in the art may make various modifications and variations to the embodiments of the present disclosure without departing from the spirit and scope of the present disclosure. In this way, if the modifications and variations of the present disclosure fall within the scope of the claims of the present disclosure and their equivalent technologies, the present disclosure is also intended to include the modifications and variations.

What is claimed is:

1. A backlight module, comprising:
   a back panel, wherein the back panel comprises a bottom plate and a side plate formed at a periphery of the bottom plate, and the back panel is provided with hanging elements;
   a first middle frame, wherein the first middle frame is located at one side of the back panel, and a surface away from the bottom plate, of the first middle frame is provided with a bearing surface for supporting a film layer; and
   the film layer,
   wherein the film layer is at a side away from the back panel, of the first middle frame, the film layer is provided with a first side, a second side, a third side, and a fourth side, the first side is opposite the second side, the third side is opposite the fourth side, the third side and the fourth side are between the first side and the second side and are connected to the first side and the second side,
   a plurality of hanging holes are provided at edges of the film layer corresponding to the first side and to the third side, the hanging holes correspond one-to-one to hanging elements, in each set of hanging hole and hanging element corresponding to each other, the film layer is connected to the back panel via the hanging hole for the hanging element to pass therethrough,
   in each set of the hanging hole and the hanging element corresponding to each other on the first side, a first gap is provided between a sidewall away from the fourth side, of the hanging element and a sidewall away from the fourth side, of the hanging hole, and in a direction from the third side to the fourth side, the first gaps between the hanging holes and hanging elements corresponding to each other gradually increase in size; and
   in each set of the hanging hole and the hanging element corresponding to each other on the third side, a first gap is provided between a sidewall away from the second side, of the hanging element and a sidewall away from the second side, of the hanging hole, and in a direction from the first side to the second side, the first gaps between the hanging holes and hanging elements corresponding to each other gradually increase in size.

2. The backlight module according to claim 1, wherein in each set of the hanging hole and the hanging element corresponding to each other on the first side, a second gap is provided between a sidewall away from the first side, of the hanging element and a sidewall away from the first side, of the hanging hole, a third gap is provided between a sidewall away from the third side, of the hanging element and a sidewall of the hanging hole away from the third side, of the hanging hole, and a fourth gap is provided between a sidewall away from the second side, of the hanging element and a sidewall away from the second side, of the hanging hole, wherein the second gaps are equal to each other in size, the third gaps are equal to each other in size, and the fourth gaps are equal to each other in size.

3. The backlight module according to claim 2, wherein in each set of the hanging hole and the hanging element corresponding to each other on the first side, in a direction from the third side to the fourth side, the first gaps between the hanging holes and hanging elements corresponding to each other linearly and gradually increase in size.

4. The backlight module according to claim 2, wherein in each set of the hanging hole and the hanging element corresponding to each other on the third side, in a direction from the first side to the second side, the first gaps between the hanging holes and hanging elements corresponding to each other linearly and gradually increase in size.

5. The backlight module according to claim 2, wherein in each set of the hanging hole and the hanging element corresponding to each other on the first side:
the second gap is 0.4 mm-0.6 mm;
the third gap 0.45 mm-0.55 mm; and
the fourth gap is 0 mm.

6. The backlight module according to claim 2, wherein in each set of the hanging hole and the hanging element corresponding to each other on the third side:
the second gap is 0.4 mm-0.6 mm;
the third gap is 0.45 mm-0.55 mm; and
the fourth gap is 0 mm.

7. The backlight module according to claim 2, wherein in each set of the hanging hole and the hanging element corresponding to each other on the first side:
the second gap between the hanging hole and the hanging element corresponding to each other is 0.4 mm-0.6 mm, the third gap between the hanging hole and the hanging element corresponding to each other is 0.45 mm-0.55 mm, and the fourth gap between the hanging hole and the hanging element corresponding to each other is 0 mm; and
in each set of the hanging hole and the hanging element corresponding to each other on the third side:
the second gap between the hanging hole and the hanging element corresponding to each other is 0.4 mm-0.6 mm, the third gap between the hanging hole and the hanging element corresponding to each other is 0.45 mm-0.55 mm, and the fourth gap between the hanging hole and the hanging element corresponding to each other is 0 mm.

8. The backlight module according to claim 1, wherein in each set of the hanging hole and the hanging element corresponding to each other on the third side, a second gap is provided between a sidewall away from the third side, of the hanging element and a sidewall away from the third side, of the hanging hole, a third gap is provided between a sidewall away from the first side, of the hanging element and a sidewall away from the first side, of the hanging hole, and a fourth gap is provided between a sidewall away from the fourth side, of the hanging element and a sidewall away from the fourth side, of the hanging hole, wherein the second gaps are equal to each other in size, the third gaps are equal to each other in size, and the fourth gaps are equal to each other in size.

9. The backlight module according to claim 1, wherein a plurality of hanging holes are provided at an edge of the film layer corresponding to the second side, hanging elements corresponding one-to-one to the hanging holes are provided on the back panel, and in each set of the hanging hole and the hanging element corresponding to each other, the hanging element is connected to the film layer via the hanging hole; and in each set of the hanging hole and the hanging element corresponding to each other on the second side, the first gap is provided between the sidewall away from the second side, of the hanging element and the sidewall away from the second side of the hanging hole, a second gap is provided between a sidewall away from the first side, of the hanging element and a sidewall away from the first side, of the hanging hole, a third gap is provided between a sidewall away from the fourth side, of the hanging element and a sidewall away from the fourth side, of the hanging hole, and a fourth gap is provided between a sidewall away from the third side, of the hanging element and a sidewall away from the third side, of the hanging hole.

10. The backlight module according to claim 9, wherein in each set of the hanging hole and the hanging element corresponding to each other on the second side:
the first gaps are equal to each in size;
the second gaps are equal to each in size;
in a direction of from the third side to the fourth side, the third gaps gradually increase in size; and
the fourth gaps are equal to each in size.

11. The backlight module according to claim 10, wherein in each set of the hanging hole and the hanging element corresponding to each other on the second side:
the first gap is 1 mm-1.5 mm;
the second gap other is 0.4 mm-0.6 mm;
in a direction from the third side to the fourth side, the third gaps between the hanging holes and hanging elements corresponding to each other linearly and gradually increase in size; and
the fourth gap is 0.45 mm-0.55 mm.

12. The backlight module according to claim 1, further comprising a reflective plate and a diffusion plate, wherein
the reflective plate is between the back panel and the film layer;
the diffusion plate is between the reflective plate and the film layer, and a side away from the film layer, of the diffusion plate makes contact with the bearing surface;
the diffusion plate is provided with a first side, a second side, a third side, and a fourth side, in the diffusion plate, the first side is opposite the second side, the third side is opposite the fourth side, the third side and the fourth side are between the first side and the second side and are connected to the first side and the second side; edges corresponding to the first side and the third side of the diffusion plate are both provided with a plurality of positioning recesses; and
the back panel is provided with positioning inserts corresponding one-to-one to the positioning recesses, and in each set of positioning recess and positioning insert corresponding to each other, the positioning inserts are clamped into the positioning recesses so as to be positioned in the diffusion plate in an inserted manner.

13. The backlight module according to claim 12, wherein an edge corresponding to the second side of the diffusion plate is provided with a plurality of positioning recesses, and the plurality of positioning recesses on the second side of the diffusion plate and the plurality of positioning recesses on the first side of the diffusion plate are arranged symmetrically with respect to a centerline of the diffusion plate parallel to the first side.

14. The backlight module according to claim 12, wherein an edge corresponding to the fourth side of the diffusion plate is provided with a plurality of positioning recesses, and the plurality of positioning recesses on the fourth side of the diffusion plate and the plurality of positioning recesses on the third side of the diffusion plate are arranged symmetrically with respect to a centerline of the diffusion plate parallel to the third side.

15. The backlight module according to claim 12, wherein an edge corresponding to the second side of the diffusion plate is provided with a plurality of positioning recesses, and the plurality of positioning recesses on the second side of the diffusion plate and the plurality of positioning recesses on the first side of the diffusion plate are arranged symmetrically with respect to a centerline of the diffusion plate parallel to the first side; and
 an edge corresponding to the fourth side of the diffusion plate is provided with a plurality of positioning recesses, and the plurality of positioning recesses on the fourth side of the diffusion plate and the plurality of positioning recesses on the third side of the diffusion plate are arranged symmetrically with respect to a centerline of the diffusion plate parallel to the third side.

16. The backlight module according to claim 12, wherein positioning recesses on the first side of the diffusion plate comprise two first positioning recesses, the two first positioning recesses are arranged symmetrically at two sides of a centerline of the diffusion plate parallel to the third side, and a side of each of the first positioning recesses away from the centerline of the diffusion plate parallel to the third side is provided with a second positioning recess;
 first gaps of the first positioning recesses are provided between sidewalls of the first positioning recesses close to the centerline of the diffusion plate parallel to the third side and sidewalls of the corresponding positioning inserts close to the centerline of the diffusion plate parallel to the third side, first gaps of the second positioning recesses are provided between sidewalls of the second positioning recesses close to the centerline of the diffusion plate parallel to the third side and sidewalls of the corresponding positioning inserts close to the centerline of the diffusion plate parallel to the third side, and the first gaps of the first positioning recesses are smaller than the first gaps of the second positioning recesses;
 positioning recesses on the third side of the diffusion plate comprise two third positioning recesses, the two third positioning recesses are arranged symmetrically at two sides of a centerline of the diffusion plate parallel to the first side, and a side of each of the third positioning recesses away from the centerline of the diffusion plate parallel to the first side is provided with a fourth positioning recess; and
 first gaps of the third positioning recesses are provided between sidewalls of the third positioning recesses close to the centerline of the diffusion plate parallel to the first side and sidewalls of the corresponding positioning inserts close to the centerline of the diffusion plate parallel to the first side, first gaps of the fourth positioning recesses are provided between sidewalls of the fourth positioning recesses close to the centerline of the diffusion plate parallel to the first side and sidewalls of the corresponding positioning inserts close to the centerline of the diffusion plate parallel to the first side, and the first gaps of the third positioning recesses are smaller than the first gaps of the fourth positioning recesses.

17. The backlight module according to claim 16, wherein in the positioning recesses on the first side of the diffusion plate:
 second gaps of the first positioning recesses are provided between sidewalls of the first positioning recesses away from the centerline of the diffusion plate parallel to the third side and sidewalls of the corresponding positioning inserts away from the centerline of the diffusion plate parallel to the third side, second gaps of the second positioning recesses are provided between sidewalls of the second positioning recesses away from the centerline of the diffusion plate parallel to the third side and sidewalls of the corresponding positioning inserts away from the centerline of the diffusion plate parallel to the third side, third gaps of the first positioning recesses are provided between bottom walls of the first positioning recesses and sidewalls of positioning inserts facing bottoms of the first positioning recesses, and third gaps of the second positioning recesses are provided between bottom walls of the second positioning recesses and sidewalls of positioning inserts facing bottoms of the second positioning recesses; and
 in the positioning recesses on the third side of the diffusion plate:
 second gaps of the third positioning recesses are provided between sidewalls of the third positioning recesses away from a centerline of the diffusion plate and sidewalls of the corresponding positioning inserts away from the centerline of the diffusion plate parallel to the first side, second gaps of the fourth positioning recesses are provided between sidewalls of the fourth positioning recesses away from the centerline of the diffusion plate parallel to the first side and sidewalls of the corresponding positioning inserts away from the centerline of the diffusion plate parallel to the first side, third gaps of the third positioning recesses are provided between bottom walls of the third positioning recesses and sidewalls of positioning inserts facing bottoms of the third positioning recesses, and third gaps of the fourth positioning recesses are provided between bottom walls of the fourth positioning recesses and sidewalls of positioning inserts facing bottoms of the fourth positioning recesses.

18. The backlight module according to claim 17, wherein in the positioning recesses on the first side of the diffusion plate:
 the first gaps of the first positioning recesses are 0.15 mm-0.2 mm;
 the second gaps of the first positioning recesses are 0.2 mm-0.25 mm;
 the third gaps of the first positioning recesses are 2.1 mm-2.5 mm;
 the first gaps of the second positioning recesses are 3.0 mm-3.5 mm;
 the second gaps of the second positioning recesses are 1.0 mm-1.5 mm; and
 the third gaps of the second positioning recesses are 2.1 mm-2.5 mm; and
 in the positioning recesses on the third side of the diffusion plate:

the first gaps of the third positioning recesses are 0.15 mm-0.2 mm;

the second gaps of the third positioning recesses are 0.2 mm-0.25 mm;

the third gaps of the third positioning recesses are 3.5 mm-4.0 mm;

the first gaps of the fourth positioning recesses are 2.0 mm-2.5 mm;

the second gaps of the fourth positioning recesses are 1.0 mm-1.5 mm; and the third gaps of the fourth positioning recesses are 3.5 mm-4.0 mm.

19. The backlight module according to claim 12, further comprising a plurality of parallel light bars, wherein the light bars are on a side facing the reflective plate, of the back panel, each of the light bars is provided with a plurality of lamp beads arranged at intervals, the lamp beads on two adjacent light bars correspond one-to-one to each other in a direction perpendicular to an extension direction of the light bars, and a connection line of the two lamp beads corresponding one-to-one to each other is perpendicular to the extension direction of the light bars; and the lamp beads penetrate through avoidance holes on the reflective plate, a side facing the diffusion plate, of the reflective plate is provided with a plurality of supporting assemblies for supporting the diffusion plate, and the supporting assemblies are at midpoints of connection lines of two lamp beads corresponding one-to-one to each other in the two adjacent light bars.

20. A display apparatus, comprising the backlight module according to claim 1.

\* \* \* \* \*